Figure 3:
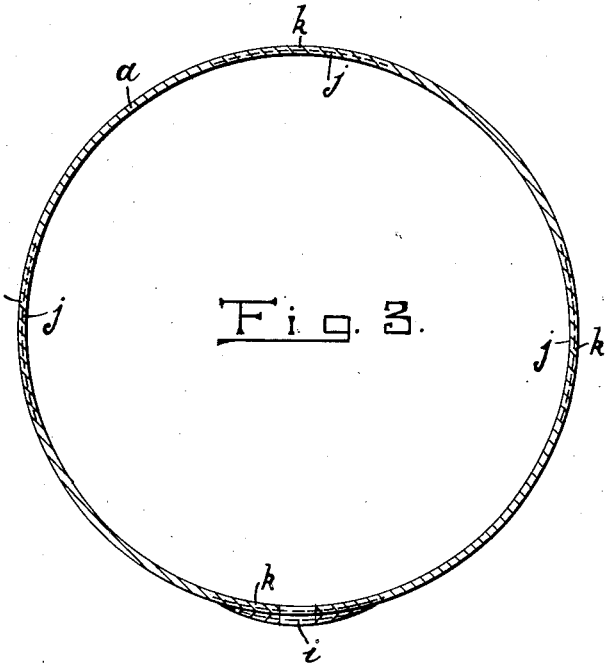

L. H. SWAIN.
ROAD WHEEL FOR MOTOR VEHICLES.
APPLICATION FILED JAN. 5, 1917.

1,403,821. Patented Jan. 17, 1922.

Inventor
Leonard H. Swain
by Herbert W. Jenner.
Attorney

UNITED STATES PATENT OFFICE.

LEONARD HARTLEY SWAIN, OF MANCHESTER, ENGLAND.

ROAD WHEEL FOR MOTOR VEHICLES.

1,403,821.  Specification of Letters Patent.  Patented Jan. 17, 1922.

Application filed January 5, 1917. Serial No. 140,794.

(GRANTED UNDER THE PROVISIONS OF THE ACT OF MARCH 3, 1921, 41 STAT. L., 1313.)

*To all whom it may concern:*

Be it known that I, LEONARD HARTLEY SWAIN, subject of the King of Great Britain and Ireland, and resident of Manchester, in the county of Lancaster, England, have invented certain Improvements in Road Wheels for Motor Vehicles, (for which I have filed an application in England on October 22, 1915, Patent No. 14,948,) of which the following is a specification.

My invention relates to improvements in or in connection with the wheels and tyres of motor vehicles and particularly to those in which pneumatic tyres are employed. In connection with these it will be understood that the beaded edges of the tyre covers usually leave a small space between their inner edges and expose a small portion of the rim of the wheel so that the inner part of the air tube rests upon such narrow portion of the rim. It is well known that in the course of the running of the tyres moisture passes beneath the cover and through the valve and security bolt holes or in the case of the split rims through the joint thereof and has a tendency to set up corrosion of the inner part of the rim previously referred to. Such corrosion has a deleterious influence on the air tube by tending to cause it to rot or perish at its inner side. Sometimes the air tubes are thickened at the inner side next to the rim by a special strip of rubber placed entirely around in a circumferential direction and permanently attached thereto but this only means an actual thickening of the tube at the point referred to and does not eliminate the corrosion nor prevent moisture getting into the central portion of the rim.

It has also previously been proposed to employ a circumferential rubber cushion bearing on the wheel rim at its centre and located between the air tube and the outer cover of the tyre. In another case a circumferential rubber strip has been placed in the centre of the rim for the air tube to rest upon, this strip having holes in it to pass over the outer ends of the wheel spokes. In a further proposal a plain rubber strip has been placed between the air tube and the wheel rim and has sometimes been combined with the usual protecting fabric tape. Again strips of rubber have been located between the inner edges of the wheel rim and the outer cover of the tyre.

My invention comprises a protecting endless or transversely-divided band of rubber thick in the centre and tapered to feather edges at the sides; a protecting endless or transversely-divided band of rubber provided with one or a plurality of short strips of fabric arranged in or upon the band at the points where the security bolts and valve stem of the tyre are located, holes being formed in the band for the bolts, and tube to pass through. Or an endless band of rubber with a strip of fabric arranged in or fixed upon it, and extending for almost the full circumference of the band so leaving a small portion of the band elastic to enable it to be stretched over the wheel rim into position thereon. A still further modification comprises an endless rubber band having secured to or embedded in it an entire circumferential strip of fabric arranged on the bias to enable the band to be stretched into position on the wheel rim.

My invention will be fully described with reference to the accompanying drawing in which—

Figure 1:
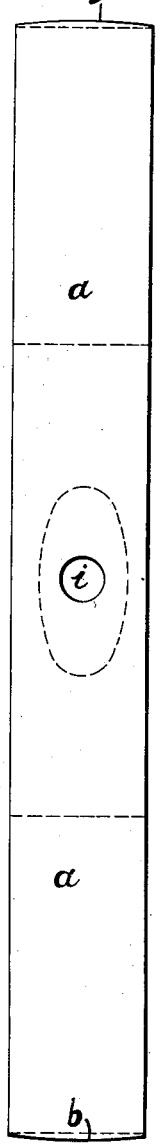
Figure 2:
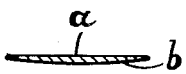

Fig. 1. is an elevation of the rubber strip or band prior to its application to the rim of a wheel, Fig. 2. transverse section of same.

Figure 4:
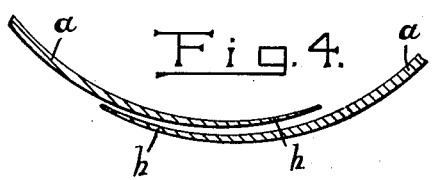

Fig. 3. sectional side elevation of the band,

Fig. 4. partial sectional side elevation of the band in modified form and

Figure 5:
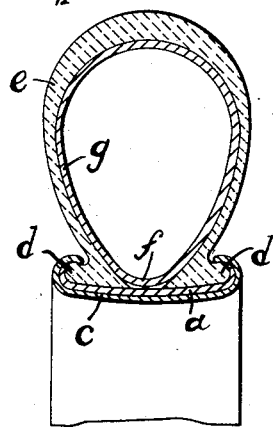

Fig. 5. transverse section of a pneumatic tyre and wheel rim showing the application of my invention thereto.

With the aforesaid objects in view the rubber strip $a$ which I employ is somewhat thicker in the middle $b$ than at the edges, the latter being gradually tapered to feather edges. This construction enables the strip to adapt itself to the conformation of the rim $c$ as shown in Fig. 5. and to provide a good surface for the beaded edges $d$ of the tyre cover $e$ and the inner part $f$ of the air tube $g$ to rest upon.

The indiarubber strip $a$ is preferably made in the form of an endless band of the required width as shown in Fig. 1. to correspond with the various sizes of rims employed and is somewhat less in diameter than the external diameter of the rim at its central portion so that the band can be stretched over the beaded edges of the rim c and then contract tightly upon the central surface of the latter. On the other hand the strip need not be endless in which case it is sufficiently long to pass around the rim c and overlap as in Fig. 4, solutioned surfaces being provided on the overlapping portions at h to allow of their being secured together after passing around the rim, the strip being stretched prior to the joint being completed.

As a strip made entirely of rubber may tear at the points where holes i and j are made in it for the passage of the inflating valve of the air tube and the screwed shanks of the security bolts, respectively, I strengthen the strip by fixing thereto or embedding therein one or more narrow strips of proofed canvas or fabric at the points k where the valve and security bolts would pass through thus preventing any tendency of the rubber strip to tear. Where one strip only is used this may extend almost the whole of the way around the rubber strips in a circumferential direction, only sufficient length of the rubber strip being left without canvas to enable it to be stretched in the manner and for the purpose referred to. The holes i and j for the valve and security bolts can be formed in the strip preparatory to placing it in position or they may be made after it is placed in position, the former method for the valve and the latter method for the bolts being the best.

The single strip canvas hereinbefore referred to may be cut on the bias and in such a case may continue for the full length of the strip of rubber or for the full circumference of the ring or band so that in the latter case the ring could be extended in diameter for passing over the rim flanges.

The improved arrangement hereinbefore described entirely prevents the corrosion of the rim and consequently protects the inner tube besides providing a resilient and comfortable surface for the tube to rest upon. The canvas insertion makes the rubber band very efficient and prevents any possibility of creeping by the band in a direction circumferentially of the wheel rim.

What I claim and desire to secure by Letters Patent is:—

1. A means for preventing the corrosion of wheel rims, comprising a band of elastic material thickest in the middle and tapering therefrom to each edge, said band being adapted to be stretched around the rim under the tire.

2. A means for preventing the corrosion of wheel rims, comprising a band of india rubber having overlapping end portions which are cemented together, said band being thickest in the middle and tapering therefrom to each edge and being adapted to be stretched around the rim under the tire.

3. A means for preventing the corrosion of wheel rims, comprising a band of elastic material thickest in the middle and tapering therefrom to each edge, said band being adapted to be stretched around the rim under the tire, said band having holes through it and strips of re-inforcing textile material secured around the said holes.

4. A means for preventing the corrosion of wheel rims, comprising a band of elastic material thickest in the middle and tapering therefrom to each edge, said band having a strip of re-inforcing canvas arranged on the bias and secured around it and said band being adapted to be stretched around the rim under the tire.

In testimony wherof I have hereunto set my hand in the presence of two witnesses:—

LEONARD HARTLEY SWAIN.

Witnesses:
WILLIAM H. TAYLOR,
MARGARET G. RAMSBOTTOM.